(12) United States Patent
Berezecki

(10) Patent No.: US 8,819,349 B2
(45) Date of Patent: Aug. 26, 2014

(54) INVOKING OPERATING SYSTEM FUNCTIONALITY WITHOUT THE USE OF SYSTEM CALLS

(75) Inventor: Mateusz Berezecki, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 621 days.

(21) Appl. No.: 13/179,369

(22) Filed: Jul. 8, 2011

(65) Prior Publication Data

US 2013/0013869 A1    Jan. 10, 2013

(51) Int. Cl.
*G06F 12/00* (2006.01)
*G06F 9/54* (2006.01)

(52) U.S. Cl.
CPC ..................................... *G06F 9/544* (2013.01)
USPC ........... 711/150; 711/151; 711/152; 711/163; 711/167

(58) Field of Classification Search
USPC .......................... 711/150, 151, 152, 163, 167
See application file for complete search history.

(56) References Cited

U.S. PATENT DOCUMENTS

2006/0075060 A1*  4/2006  Clark ............................ 709/213
2009/0077564 A1*  3/2009  Loeser .......................... 718/108

* cited by examiner

*Primary Examiner* — Gurtej Bansal
(74) *Attorney, Agent, or Firm* — Fenwick & West LLP

(57) ABSTRACT

Embodiments of the invention operate within the context of a system with a processor providing memory-monitoring functionality. The lower-privileged code of a first process, such as user application code, communicates directly with higher-privileged code of a second process, such as interrupt-handling code of the operating system kernel, without using a software interrupt or other gate mechanism. This enhances overall system performance by eliminating the saving of state and processing inherent in interrupt handling, and also avoids missing events that may occur while other interrupts are masked during event handling. Specifically, the second process initializes a monitored memory area that is directly accessible by processes having at least the privilege level of the first process. The second process further initializes memory-monitoring hardware of the processor to monitor writes to the monitored memory area, such that the second process will resume execution from a dormant state when a write takes place.

9 Claims, 2 Drawing Sheets

INVOKING OPERATING SYSTEM FUNCTIONALITY WITHOUT THE USE OF SYSTEM CALLS

BACKGROUND

The disclosure herein generally relates to enhancing software application performance within a given hardware and operating system environment.

Interrupt-driven processors frequently execute code at different privilege levels, the different privilege levels conveying different permissions to perform operations. For example, the executable code of an operating system, such as the code for the operating system kernel, is typically run at a higher privilege level than the code of ordinary application programs. In this environment, application code or other code running at a lower privilege level may lack sufficient permissions to perform certain operations, such as writing to particular areas of memory (e.g., writing to memory of the network stack for sending a packet). In consequence, the application code must communicate a request to the code of a high privilege level, such as the operating system kernel code, to perform the operation on its behalf. In order to maintain security, the request must typically be made through some form of gate mechanism—such as an interrupt, or a system call resulting in a software interrupt—that causes a hardware protection check of the operation to ensure that it does not violate security constraints. For this reason, the application cannot communicate directly with the operating system kernel.

However, the use of software interrupts and other gate mechanisms imposes additional overhead and can lead to significant degradation of performance and even to lost data. In response to a software interrupt from an application, the operating system must save the state of the application, execute appropriate code to handle the interrupt, and then restore the application state, disabling further interrupt processing while this is taking place. This process can be time-consuming relative to other processing operations and in the aggregate can consume a significant share of the system's processing in a system experiencing frequent interrupts, such as when performing a significant number of I/O operations such as reading from a solid state disk or sending data over a network interface. Further, since interrupt processing is disabled, if other interrupts occur during interrupt processing the interrupts will not be handled and thus any information associated with the interrupt will be lost.

SUMMARY

Embodiments of the invention operate within the context of a system with a processor providing memory-monitoring functionality and having more than one processor core. The lower-privileged code of a first process, such as user application code, communicates directly with higher-privileged code of a second process, such as code of the operating system kernel, without using a software interrupt or other gate mechanism. This enhances overall system performance by eliminating the saving of state and processing inherent in interrupt handling, and also avoids missing events that may occur while other interrupts are masked during interrupt handling.

More specifically, the second process initializes a monitored memory area that is directly accessible by processes having at least the privilege level of the first process. The second process further initializes memory-monitoring hardware of the processor to monitor writes to the monitored memory area, such that the second process will resume execution from a dormant state when a write takes place.

With this initialization performed, the first process can use the monitored memory to communicate a request for the second process to carry out a privileged service on behalf of the first process, without needing to use a software interrupt or other gate mechanism. That is, when the first process needs the second process to perform a service such as sending a packet on its behalf, instead of making a request for the service via a system call triggering a software interrupt, the first process writes information describing the request (or a pointer to the information) into the monitored memory. The memory monitoring hardware then awakens the second process from a dormant state, and the second process reads the information and invokes the service using the information.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
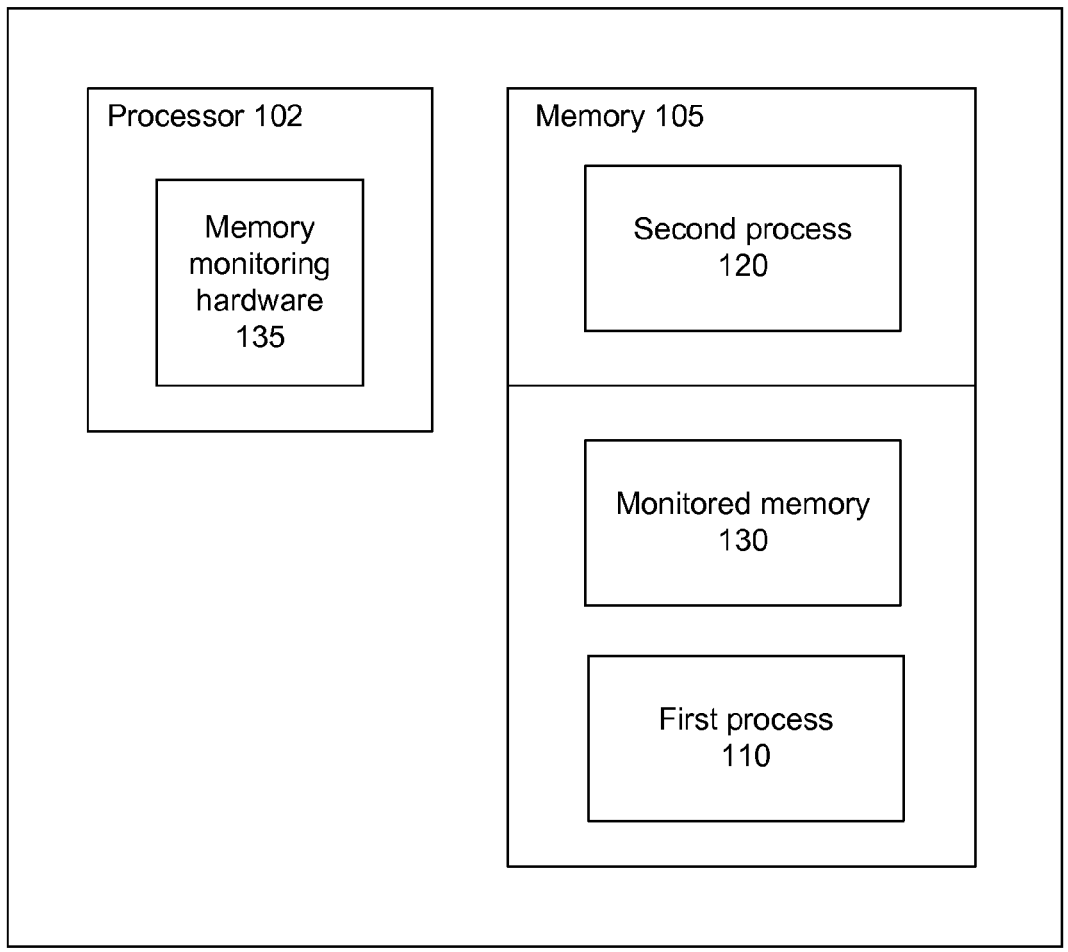
FIG. 1 is a high-level block diagram of a computing system, according to one embodiment.

FIG. 1 is a high-level block diagram of a computing system 100, according to one embodiment. The system 100 may be, for example, a content server system in which a large number of requests to write and/or read data packets or files take place, such as occurs when a remote client of the system requests to see content like images or videos. The system 100 includes at least one processor 102 that executes instructions stored in a memory 105, as well as memory monitoring hardware 135 that monitors accesses to specific portions of the memory. These components are now described in more detail.

The memory 105 holds instructions and data used by the processor 102. In one embodiment, the memory 105 comprises RAM, such as conventional DRAM or SRAM. An operating system of the system 100 provides that a number of different privilege levels may be associated with resources of the system 100, such as segments of the memory 105.

The processor 102 executes instructions stored in the memory 105, and can be a general-purpose processor such as an INTEL x86-compatible CPU. The processor 102 includes multiple cores, each able to execute instructions in parallel, independent of the other cores. The processor 102 stores the privilege level of the currently-executing code. The processor 102 also supports interrupts. Namely, when the processor 102 receives an interrupt input signal, the processor transfers control to appropriate interrupt handler code of the operating system kernel, changes the current privilege level to the highest level to indicate that the kernel is now executing, disables handling of certain types of interrupts, executes the interrupt handler code, restores the current privilege level to the prior level, re-enables interrupt handling, and returns control to the code that was executing at the time of the interrupt.

The processor 102 comprises memory-monitoring hardware 135 that supports instruction sets such as SSE3 (SIMD streaming extensions version 3). The memory-monitoring hardware 135 supports a 'monitor' instruction (e.g., the MONITOR instruction in SSE3) that specifies to the memory-monitoring hardware a particular segment or other region of the memory 105. The memory-monitoring hardware 135 further supports a 'wait' instruction (e.g., the MWAIT instruction in SSE3) that causes the processor core executing the instruction to enter a dormant power-saving state until data is written to the memory region specified by the 'monitor' instruction, at which point the memory monitoring hardware causes the waiting processor core to resume execution. The memory-monitoring hardware may cause the waiting processor core to resume execution only if a write to the memory region is of at least some predetermined minimum size and at most some predetermined maximum size.

A first process 110 (such as a process for a typical user application) and a second process 120 (such as an event handler of the operating system kernel) are loaded into the memory 105. The first process 110 is associated with a lower privilege level than that of the second process 120. Thus, based on the security rules enforced by the processor 102, the first process 110 may be denied access to certain resources and/or prevented from performing certain operations that the second process 120 might be allowed to access or perform. For example, in order to send a packet over a network, the first process 110 must write the packet data to a segment of the memory 105 belonging to the network protocol stack and having a higher privilege level than that of the first process. However, the hardware security checks of the processor 102 do not permit the first process 110 to write directly into the network protocol stack memory segment, and hence the first process requires the second process 120 to perform the write on its behalf.

The second process 120 further allocates a monitored memory area 130 with a privilege level such that the first process—or processes having at least the privilege level of the first process—are allowed to access that area. The monitored memory area 130 may be, for example, a single operating system-defined segment of memory, and may be of write-back memory type. The second process 120 further monitors the memory 130 using the 'monitor' and 'wait' instructions, entering a dormant state after executing the 'wait' instruction. Thus, when the first process 110 writes data to the monitored memory 130, the second process 120 begins execution again and can take appropriate actions based on the data written to the monitored memory. In one embodiment, the first process 110 and the second process 120 are executed on separate cores of the processor 102.

Figure 2:
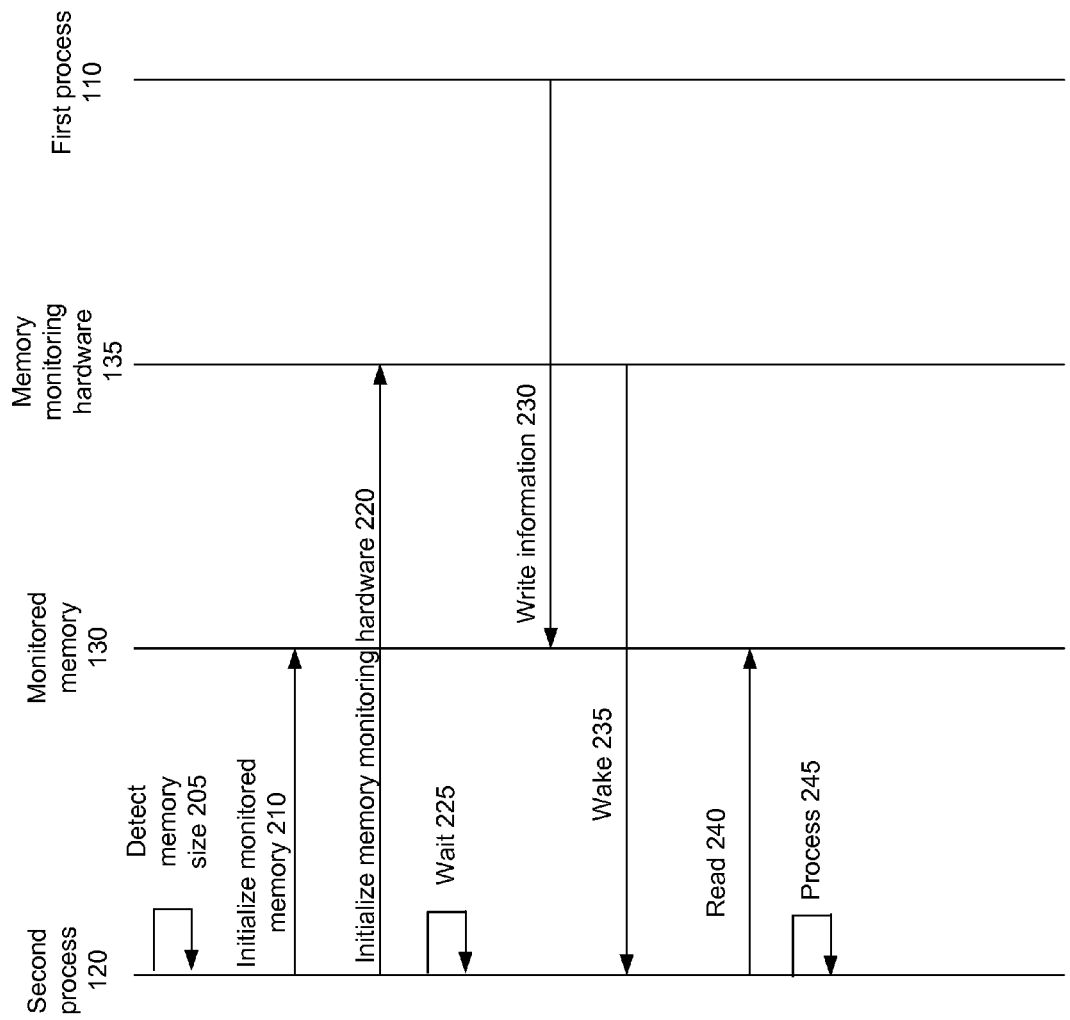
FIG. 2 is an interaction diagram illustrating the interactions of components of the computing environment of FIG. 1 that occur when the first process invokes a service performed by the second process, according to one embodiment.

FIG. 2 is an interaction diagram illustrating the interactions of components of the computing environment of FIG. 1 that occur when the first process 110 invokes a service performed by the second process 120, according to one embodiment. As illustrated, the second process 120 detects 205 memory write sizes that will cause the memory monitoring hardware 135 to wake a waiting processor core, such sizes being a property of the processor 102. For example, the second process 120 might query the minimum and maximum hardware memory monitoring line sizes. The second process initializes 210 the monitored memory 130, such as by issuing an operating system call, such as malloc( ) or other kernel-level memory-management function, to dynamically allocate a region of memory based on the detected memory write sizes and any required memory types (e.g., write-back memory) and by specifying a minimum privilege level required to access the monitored memory. The second process 120 also initializes 220 the memory-monitoring hardware 135 to transfer control in response to memory writes to the monitored memory 130. That is, the second process 120 executes the 'monitor' instruction, with the size and location of the monitored memory 130 as an argument, to cause the hardware 135 to monitor the memory 130. The second process 120 also executes the 'wait' instruction, which causes the processor 120 or processor core that executes the instruction to enter a dormant state while waiting for a memory write to the monitored memory 130.

With the initialization of steps 205-225 completed, the first process can then use the monitored memory to invoke performance of a service by the second process without issuing a software interrupt. Specifically, the first process writes 230, to the monitored memory 130, information used by the second process to perform the service on behalf of the first process. As one example, assume that the first process 110 needs the service of sending a packet over a network interface of the system 100, an operation that involves writing to memory used by the operating system network protocol stack. The protocol stack memory area has an associated privilege level higher than that of the first process 110, and thus the first process cannot directly write the packet data to that memory but must instead delegate to the second process 120 or some other sufficiently privileged process. Instead of transferring control to the second process 120 via a software interrupt, the first process 110 instead writes 230 information describing the request to send the packet to the monitored memory 130. (The information describing the request to send a packet might be, for example, an operation code known by the second process that indicates a packet sending operation, and the data of the packet itself, or a pointer thereto.) In response, the memory monitoring hardware 135 detects that a write to the monitored memory 130 has taken place and accordingly wakes 235 the second process 120 and transfers control to it.

Once awakened, the second process 120 reads 240 the information that the first process wrote into the monitored memory 130, and then processes 245 that information to carry out the service request. Referring to above example of a request to send a packet, the second process 120 would inspect the operation code to determine that packet sending is desired and then would accordingly invoke the packet-sending functionality of the operating system's network stack to send the remaining information as a packet.

If the service produces a result, the second process can write the result to a location in memory 105. With the service invocation completed, the second process 120 again executes the 'wait' instruction and enters a dormant state. The first process 110 continues its own execution, such as reading 260 the result (if any) produced by the service. (The second process could write a result to a predetermined area of memory 105 expected by the first process, for example, with the first process repeatedly polling that memory area while the second process is servicing the request, until a result is ultimately written by the second process.)

Thus, using the monitored memory 130, the first process can directly provide the information for carrying out the service to the second process, without the need for a software interrupt or other form of gate.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

The steps, operations, or processes described herein may be performed or implemented with one or more hardware or software modules, alone or in combination with other devices. In one embodiment, a software module is implemented with a computer program product comprising a computer-readable storage medium containing computer program code, which can be executed by a computer processor for initiating the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    a second process detecting memory write sizes that will cause memory monitoring hardware of a processor to wake a waiting processor core;
    the second process initializing, based on the detected memory write sizes, a monitored memory area for use by processes having at least a privilege level of a first process, the second process having a higher privilege level than the privilege level of the first process;
    the second process initializing memory monitoring hardware of a processor to monitor writes to the monitored memory area;
    the first process writing, to the monitored memory area, an operation code specifying sending a packet over a network interface by the second process, and packet data representing the packet;
    the memory monitoring hardware transferring control to the second process responsive to the first process writing to the monitored memory area;
    the second process reading the operation code and packet data from the monitored memory area;
    responsive to the operation code, the second process writing the packet data to a segment of memory belonging to a network protocol stack;
    the first process polling an output memory area for output of the sending of the packet;
    the second process writing an output of the sending of the packet to the output memory area; and
    the first process reading the output from the output memory area.

2. The computer-implemented method of claim 1, wherein the second process initializing the memory monitoring hardware comprises the second process executing a MONITOR instruction of an SSE3 processor instruction set.

3. The computer-implemented method of claim 1, wherein the first process is executed by a first core of a multi-core processor and the second process is executed by a second core of the multi-core processor, the method further comprising the second process executing a wait instruction that causes the second core to enter a dormant state until a write to the monitored memory takes place.

4. A computer system comprising:
    a computer processor;
    memory monitoring hardware; and
    memory comprising a first process, a second process having a higher privilege level than the first process, and a monitored memory area;
    wherein:
        the second process detects memory write sizes that will cause memory monitoring hardware of a processor to wake a waiting processor core;
        the second process initializes, based on the detected memory write sizes, the monitored memory area for use by processes having at least a privilege level of a first process;
        the second process initializes the memory monitoring hardware to monitor writes to the monitored memory area;
        the first process writes, to the monitored memory area, an operation code specifying sending a packet over a network interface by the second process, and packet data representing the packet;
        the memory monitoring hardware transfers control to the second process responsive to the first process writing to the monitored memory area;
        the second process reads the operation code and the packet data from the monitored memory area;
        responsive to the operation code, the second process writes the packet data to a segment of memory belonging to a network protocol stack;
        the first process polls an output memory area for output of the sending of the packet;
        the second process writes an output of the sending of the packet to the output memory area; and
        the first process reads the output from the output memory area.

5. The computer system of claim 4, wherein the second process initializing the memory monitoring hardware comprises the second process executing a MONITOR instruction of an SSE3 processor instruction set.

6. The computer system of claim 4, wherein:
    the computer processor comprises a plurality of cores;
    the first process is executed by a first one of the cores; and
    the second process is executed by a second one of the cores; and
    the second process executes a wait instruction that causes the second core to enter a dormant state until a write to the monitored memory takes place.

7. A non-transitory computer-readable storage medium having executable computer program instructions for a first process and for a second process embodied therein, the instructions when executed by a processor performing actions comprising:
    the second process detecting memory write sizes that will cause memory monitoring hardware of a processor to wake a waiting processor core;
    the second process initializing, based on the detected memory write sizes, a monitored memory area for use by processes having at least a privilege level of a first process, the second process having a higher privilege level than the privilege level of the first process;
    the second process initializing memory monitoring hardware of a processor to monitor writes to the monitored memory area;

the first process writing, to the monitored memory area, an operation code specifying sending a packet over a network interface by the second process, and packet data representing the packet;

the second process reading the operation code and the packet data from the monitored memory area responsive to a transfer of control initiated by the memory monitoring hardware responsive to the first process writing to the monitored memory area;

responsive to the operation code, the second process writes the packet data to a segment of memory belonging to a network protocol stack;

the first process polling an output memory area for output of the sending of the packet;

the second process writing an output of the sending of the packet to the output memory area; and the first process reading the output from the output memory area.

8. The computer-readable storage medium of claim 7, wherein the second process initializing the memory monitoring hardware comprises the second process executing a MONITOR instruction of an SSE3 processor instruction set.

9. The computer-readable storage medium of claim 7, wherein the first process is executed by a first core of a multi-core processor and the second process is executed by a second core of the multi-core processor, the method further comprising the second process executing a wait instruction that causes the second core to enter a dormant state until a write to the monitored memory takes place.

* * * * *